Feb. 8, 1938.   F. E. A. WALLIN ET AL   2,107,402
APPARATUS FOR SEPARATING GENUINE AND SPURIOUS COINS
Filed Aug. 17, 1936   3 Sheets-Sheet 1
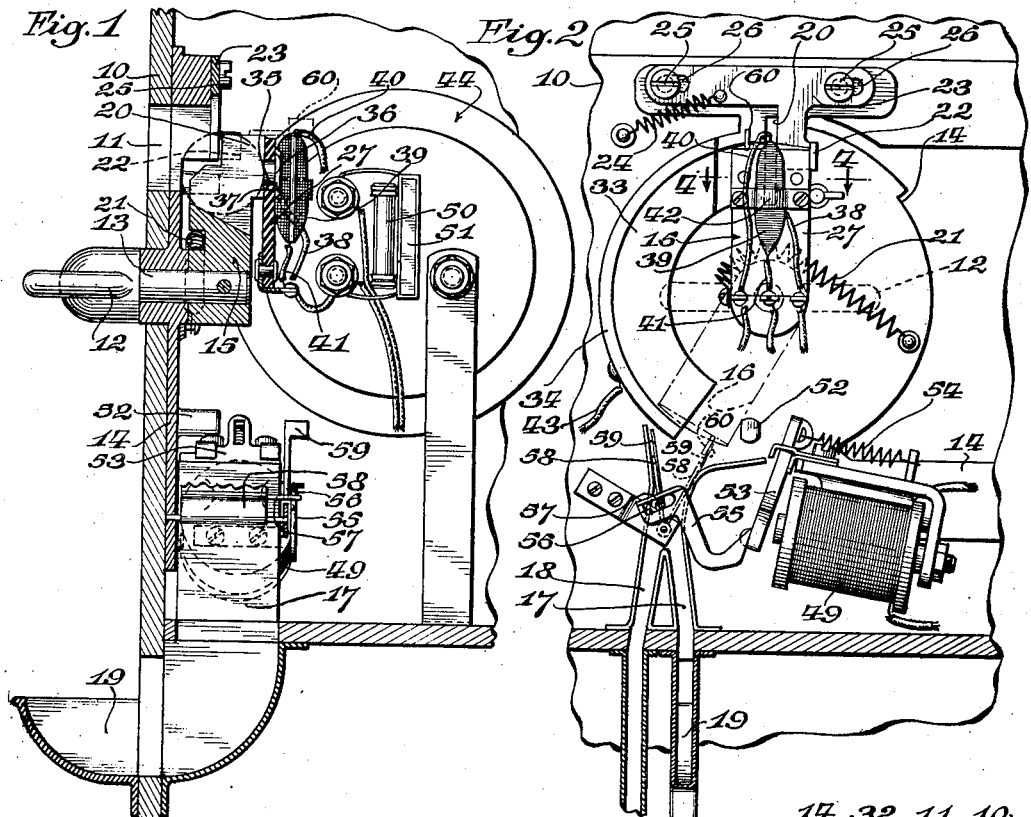
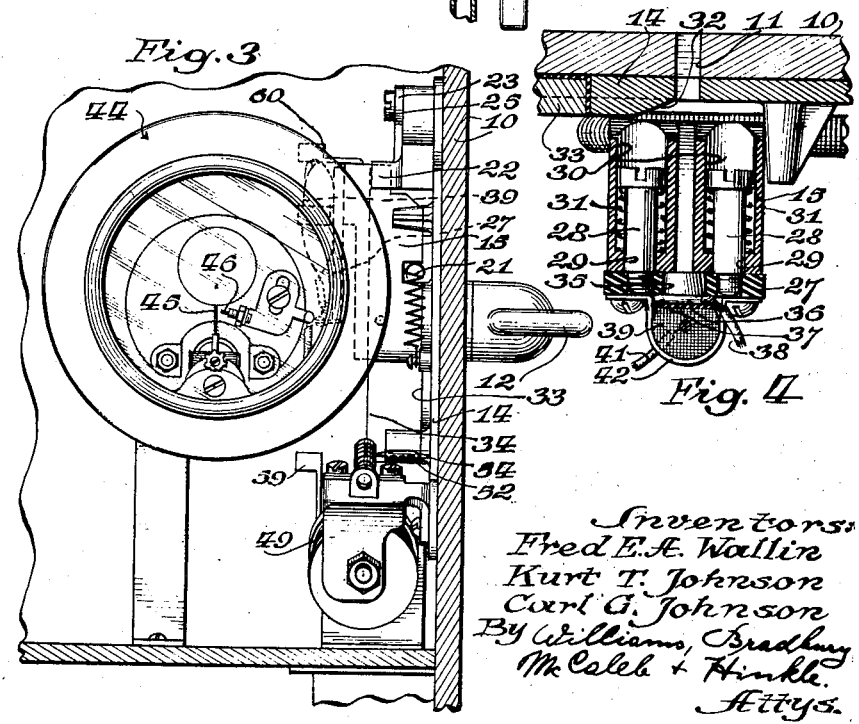
Inventors:
Fred E. A. Wallin
Kurt T. Johnson
Carl G. Johnson
By Williams, Bradbury,
McCaleb & Hinkle
Attys.

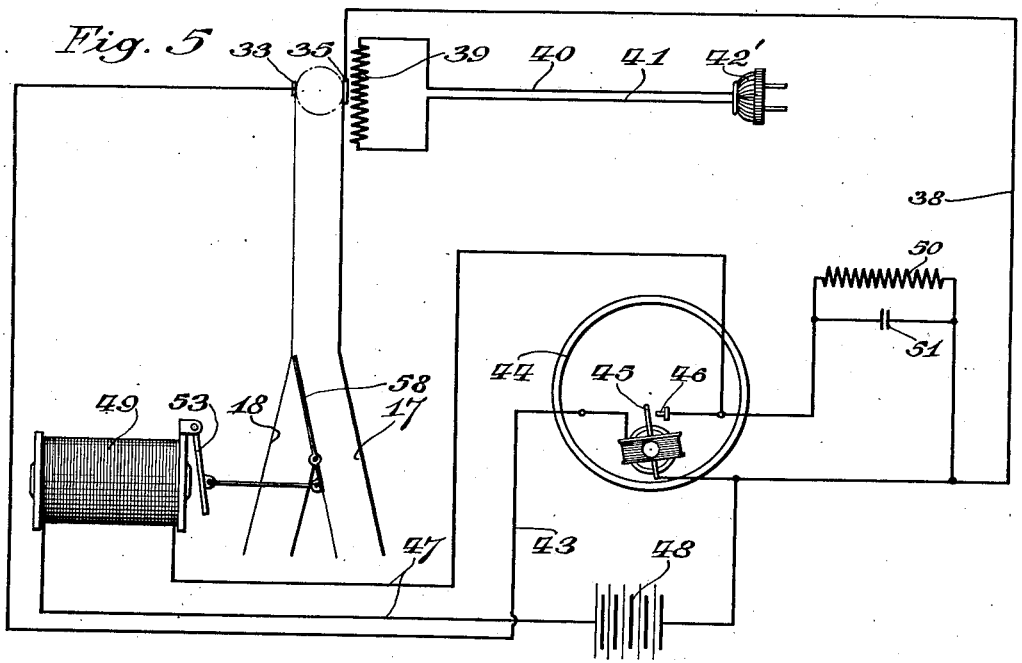
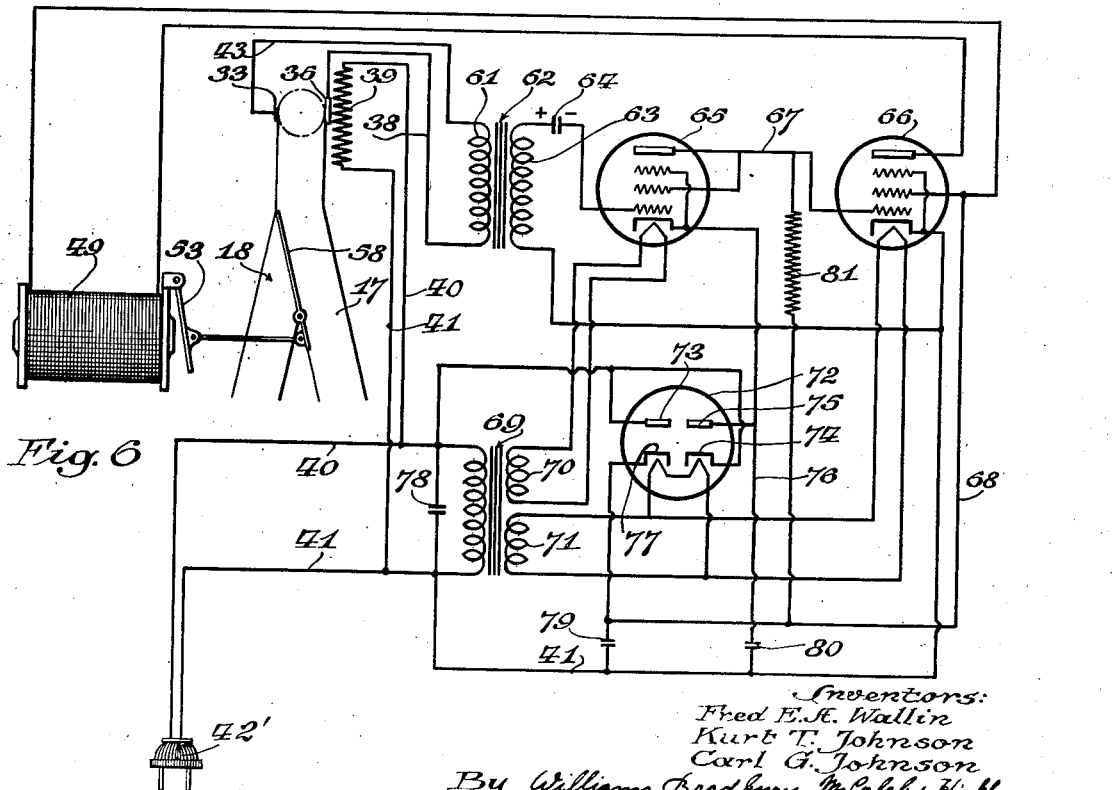

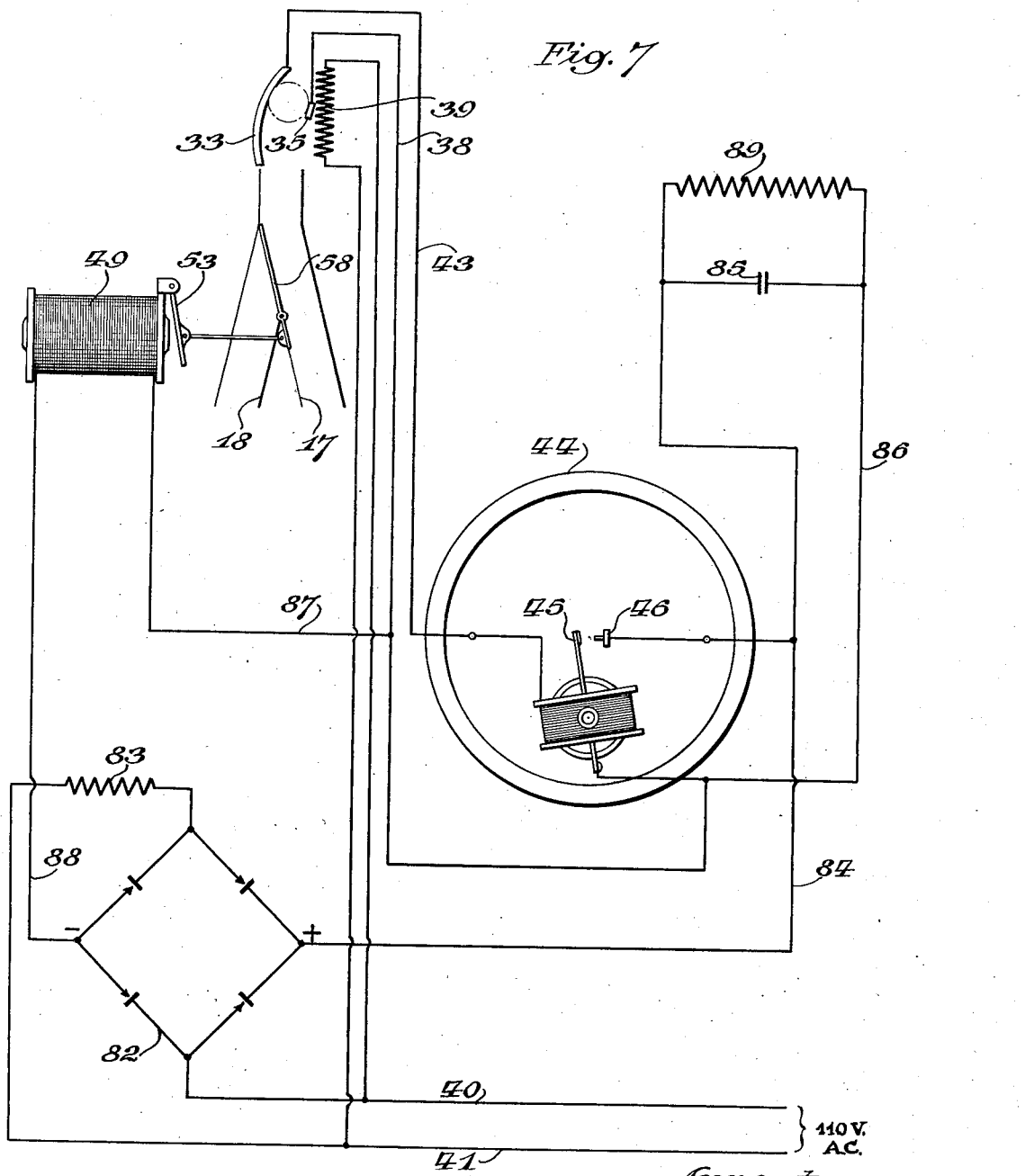

Patented Feb. 8, 1938

2,107,402

UNITED STATES PATENT OFFICE 2,107,402

APPARATUS FOR SEPARATING GENUINE AND SPURIOUS COINS

Fred E. A. Wallin, Chicago, Kurt T. Johnson, Palatine, and Carl G. Johnson, Chicago, Ill., assignors to Noel M. Seeburg, Chicago, Ill.

Application August 17, 1936, Serial No. 96,412

12 Claims. (Cl. 194—100)

This invention relates to apparatus for separating genuine and spurious coins, and is particularly applicable to the separation of genuine United States nickels or both United States and Canadian nickels from slugs and tokens manufactured from different metals and alloys.

The present invention operates on the thermocouple principle. We have discovered that the United States nickel in contact with most other metals constitutes a thermocouple which gives a higher thermoelectric current than does any other common metal, including the metals and alloys of which slugs and tokens are usually made, silver coins, and even coins of pure nickel, such as the Canadian nickel.

A coin of pure nickel, such as the Canadian nickel, gives a lesser thermoelectric effect, which is, however, much greater than that of the other metals and alloys mentioned. Our apparatus can be adjusted in sensitivity so that it will accept only United States nickels or accept both United States and Canadian nickels.

The invention will readily be understood from the following description thereof, taken in conjunction with the accompanying drawings, in which:

Figure 1 is a sectional view, taken through a preferred embodiment of our invention;

Fig. 2 is a rear view thereof;

Fig. 3 is a sectional view showing this embodiment of our invention in elevation, as viewed in the opposite direction from that of Fig. 1;

Fig. 4 is a sectional detail, taken on the line 4—4 of Fig. 2;

Fig. 5 is a wiring diagram;

Fig. 6 is a wiring diagram of a further embodiment of our invention, and

Fig. 7 is a wiring diagram of still a further embodiment of our invention.

Referring to the drawings, it will be understood that the device is enclosed within a cabinet 10 which prevents interference with the mechanism by the manipulator. In the normal operation of the device the manipulator inserts a coin by a slot 11 and then turns a handle 12 mounted on the exterior of the cabinet. The handle 12 is mounted on a shaft 13 which has a bearing in a plate 14 on the inner side of the cabinet and the inner end of the shaft 13 carries a coin carriage 15 which receives the inserted coin. When the manipulator turns the handle 12 to its fullest extent, the coin is transferred to a position designated 16 on Fig. 2, where it is allowed to drop from the carriage. The carriage is prevented from moving beyond this position by a stop 52. In so dropping it falls into either of two chutes 17 or 18. The chute 17, which receives the spurious coins, delivers them into a cup 19 mounted on the exterior of the cabinet so they can be retrieved by the manipulator. The genuine coins pass down a chute 18 to any suitable coin-actuated means or any receptacle for genuine coins.

The carriage 15 comprises a radial arm which is provided with a radial slot 20. The slot 20 extends from the outer end of the carriage 15 and extends inwardly thereof so that a coin inserted in the opening 11 drops into the slot. In its normal position the slot 20 is in alignment with the opening 11. The carriage 15 is drawn to this normal position by a spring 21 which holds it against a stop 22. The stop 22 is carried by a sliding frame 23. When the carriage 15 is moved away from its initial position by the handle 12, the frame 23 is moved laterally by a spring 24 so that a portion of the frame 23 moves into alignment with the opening 11 and prevents the insertion of a further coin. When the handle 12 is released, the spring 21 returns the carriage 15 towards its initial position and the carriage then engages the stop 22 and moves it to its extreme right position, as viewed in Fig. 2, and incidentally removes the portion of the frame 23 so that a further coin may be inserted, provided that the previous coin has been discharged from the carriage.

The frame 23 may suitably be mounted on the plate 14 by means of screws 25 which extend through slots 26 formed in the frame 23, so that this frame may move freely under the action of the spring 21 or the spring 24, as the case may be. The spring 21 is much stronger than the spring 24 so that the normal positions of the carriage 15 and the frame 23 are those shown in Fig. 2. The carriage 15 has mounted on its rear side a plate of insulating material 27. The plate 27 is carried by screws 28 which have a free sliding fit in openings 29 formed in the carriage 15.

The forward portions of these openings are enlarged, as shown at 30 (Fig. 4), to receive the enlarged heads of the screws 28. Compression springs 31 engage the heads of the screws 28 and the shoulders formed between the openings 29 and their enlarged portions 30, so that the plate 27 is normally drawn against the rear face of the carriage 15, but can be moved rearwardly therefrom as will be described. The width of the carriage 15 is somewhat smaller than the coin for which the device is intended so that the inserted coin projects beyond the front face of the carriage, as shown in Fig. 1. When the carriage 15 is moved it carries the forward edge of the coin against a cam surface 32 so that the plate 27 is moved rearwardly to a slight extent. Adjacent the cam element 32 is provided a sector 33 which is insulated from the base plate 14. This sector engages the forward edge of the coin and maintains the plate 27 in its rearwardly displaced relation. The sector 33 comprises a peripheral flange 34 which prevents the coin from being discharged from the carriage until it arrives at the position 16, whereupon the coin is free to fall out and is discharged into one of the chutes 17 or 18.

Upon the plate 27 we mount a stud 35 of suitable metal which is so located that it engages the coin in the carriage. We may mount this stud in the plate 27 in any suitable manner, but we prefer to provide it with a head 36 on its rear side so that its forward end projects through an opening in the plate 27. We secure the head 36 in place by means of a small piece of insulation 37. A conductor 38 is connected to the head of the stud 35. We mount on the rear side of the plate 27 a heating coil 39 which is supplied with current by conductors 40 and 41. The heating coil may be held in place by means of a clamp 42. This heating coil is arranged to maintain the stud 35 at a substantially constant temperature. In the embodiment of the invention shown in Figs. 1 to 6, the suitable temperature may be of the order of 200 degrees F. It will be understood, however, that wide degrees of variation of this temperature may be employed, depending upon the sensitivity of the electrical elements.

We prefer to employ a stud 35 of silver, but numerous other metals or alloys may be employed, if desired. Steel or iron may be used, but silver is preferred because of its higher resistance to corrosion. It may here be noted that when the coin is inserted into the slot 20 and the handle 12 is rotated, the coin is pressed firmly against the stud 35, and owing to the high temperature of this stud a thermocouple is created between the stud and the coin, giving a current which depends upon the physical characteristics of the coin. This current passes through a conductor 38 and through a conductor 43 connected to the sector 33 to a sensitive relay 44. This relay may comprise a very sensitive galvanometer of the D'Arsonval or swinging coil type. The coil carries a contact 45 which is adapted to engage contact 46 when a current of sufficiently high magnitude is passed through the coil by the conductors 38 and 43. The contacts 45 and 46 are located in a circuit 47 which includes a battery 48 and an electromagnet 49. The contacts 45 and 46 may be shunted by a high resistor 50 and a condenser 51 so as to minimize sparking at the contacts. The conductors 40 and 41 of the heating coil 39 may be connected to any suitable source of supply. As indicated in Fig. 5, we may connect these conductors to a plug 42' so that the heating coil may be directly connected to any conventional power outlet. While we have shown a battery 48 for operating the electromagnet 49, it will be understood that any other suitable source of electrical power may be employed, for example, the magnet 49 may be arranged to be actuated directly from the power lines in the same manner as the heater 39. The electromagnet 49 is suitably mounted on the base 14 near the lower end of the sector 33. An armature 53 is pivotally mounted adjacent one pole of the magnet and is normally drawn away from the magnet by a spring 54.

The armature 53 carries an arm 55 which is provided with a slot 56 through which passes a pin 57 carried by a light gate 58. The gate 58 is mounted so as to move between the full line position shown in Fig. 2 and the dotted line position shown in that figure, and it will thus be seen that it controls the disposition of the coin dropped at the position 16 into the chute 17 or the chute 18. When the electromagnet 49 is energized sufficiently the coin drops into the chute 18 for genuine coins and when the electromagnet is not energized sufficiently to attract the armature 53 from its normal position, the coin or token drops into the chute 17 for spurious coins and is returned to the operator by means of the cup 19.

The gate 58 rigidly carries a projection 59 and the carriage 15 carries a complementary projection 60. The projection 60 is arranged so that it will miss the projection 59 if the gate 58 retains its normal position, which is the full line position shown in Fig. 2. If, however, as in the case of a genuine coin, the gate 58 is swung from its full line to its dotted line position (Fig. 2), then the projection 60 will engage the projection 59 and will hold the gate in its displaced position so that a genuine coin delivered from the carriage at the position 16 will fall into the chute 18.

The operation of the device is as follows: A coin is inserted in the opening 11 and falls into the slot 20. The handle 12 is then turned in clockwise direction, and the coin engages the cam surface 32 and then rides over the sector 33. In so doing it holds the insulated strip 27 rearwardly against the tension of the springs 31. Consequently, firm contact is insured between the coin and the stud 35. The stud, of course, is maintained at the appropriate temperature by means of current supplied by the leads 40, 41. Immediately the carriage 15 moves away from its initial position, the spring 24 draws the frame 23 to the left, as viewed in Fig. 2, and prevents the insertion of a further coin until the carriage 15 has discharged its coin and has returned to its initial position. Owing to the substantial temperature of the stud 35, a thermocouple is established by the coin and the stud 35. Consequently, a circuit flows through conductor 38, coil of the relay 44, conductor 43, coin, and stud 35. The magnitude of this current depends upon the metal or alloy of which the coin is made. Talking in round figures, and by way of example only, we have found that with a silver stud 35 maintained at a temperature of around 200 degrees F. we get with a United States nickel a current of about 50 milliamperes. A Canadian nickel, which is of substantially pure nickel, gives a current of about 40 milliamperes, and all common alloys and metals of which slugs or counterfeit coins might be made, including the German silver, give very much lower currents. Thus, we may adjust the points 45 and 46 of the relay 44 so that they will make contact with certain metals or alloys only. Thus, by retracting the contact point 46 we can arrange the device so that only the thermionic current resulting from the United States nickel coin will be sufficient to move the contact 45 into engagement with the contact 46. On the other hand, if we desire to accept both United States and Canadian nickels we can move the contact 46 somewhat towards the contact 45 so that both a United States and a Canadian nickel will bring the points 45 and 46 into contact. When these points come into contact, a circuit is completed through the battery 46 and electromagnet 49 through circuit 47. As a result, the gate 58 is swung into its dotted line position, as viewed in Fig. 2, and is held there while the thermocouple persists. When the carriage 15 moves the coin into the position 16 the thermocouple is broken and the magnet 49 becomes deenergized. However, as soon as the thermocouple is broken the coin is free to fall into the genuine coin chute 18. Ordinarily the magnet 49 does not deenergize quickly enough to interfere with the correct disposition of the dropping coin. However, any tendency in that direction is prevented by the projection 60 which lies in the path of the projection 59 on the gate.

It will be understood that many modifications and changes may be made in the invention. Thus, we may use any suitable source of current, for example, current from the power lines instead of the battery 48. Furthermore, we may heat the contact 35 to a much lower degree and pass the relatively weak current to a suitable amplifier. The amplified current may be sufficient to energize the electromagnet 49 directly or a relay may be interposed.

In the embodiment of the invention illustrated diagrammatically in Fig. 6, we show a suitable amplifier which is particularly adapted for use with this device. The amplifier is arranged to give a very large current through the plate circuit of the last tube at the moment that the coin clears the sector 33. Since we use an amplifier in this embodiment of the invention we employ a heating coil 39 of lower power than that used in the previously described embodiment.

The conductors 38 and 43, which are connected to the stud 35 and the sector 33 respectively, are connected to the primary 61 of a step-up transformer 62. The primary 61 may suitably have a resistance of .13 ohm and the secondary 63 may have a resistance of 2010 ohms. One end of the secondary 63 is connected through a .0001 microfarad condenser 64 to the grid of a 6—J—7 tube 65. The plate of this tube is connected to the grid of a 25—A—6 tube 66 by a conductor 67. The plate of the tube 66 is connected to the winding of the electromagnet 49 and the other end of this winding is connected to a conductor 68. A primary of a transformer 69 is connected across the alternating power lines 40 and 41. This transformer has two secondaries 70 and 71. The winding 70 provides current of 6.3 voltage for heating the filament of tube 65. The winding 71 provides 25 volt current for heating the filaments of tube 66 and tube 72. The tube 72 is a 25—Z—6 rectifier tube connected as a voltage doubler. This tube has two filaments and two plates. One plate 73 is connected to the line 40 and to the cathode 74, which is associated with the other plate 75. The plate 75 is connected by a conductor 76 to the heated cathode of the tube 65. The other cathode 77 of the tube 72 is connected to the conductor 68.

The primary of the transformer 69 is shunted by a .01 microfarad condenser 78. The conductor 68 is connected to the power line 41 through a condenser 79 which has a capacity of 4 microfarads. The conductor 76 is connected to the power line 41 through a condenser 80 which has a capacity of 8 microfarads. The conductor 68 is connected through a resistance 81 of one megohm to the conductor 67. The rectifier tube 72 keeps the conductor 76 always negative. The conductor 68 is maintained always positive owing to its connection with the cathode 77. Consequently, the plates of the tubes 65 and 66 are maintained at high voltage. The left-hand side of the condenser 64 is maintained at a positive voltage owing to its connection with the conductor 41. Consequently, the right-hand plate of this condenser, which is connected to the grid of the tube 65, is negative and the grid is positive. When the coin clears the stud 35 the primary winding 61 is deenergized and the decrease of flux in the core causes a sudden flow of current, which is arranged to make the left-hand plate of the condenser 64 negative. The right-hand plate of the condenser 64 becomes positive and the grid of the tube 65 becomes negative and flow of current through the tube 65 is suddenly arrested. Consequently, the voltage of the grid of the plate 66 increases suddenly and a very large momentary current flows through the plate circuit of this tube, which circuit includes the electromagnet 49.

If the coin is genuine, this current is great enough to energize the magnet sufficiently to cause it to attract the armature 53 and cause the gate 58 to swing so as to divert the dropping coin into genuine coin chute 18. If the coin is not genuine the thermionic current is insufficient thus to throw the gate and the coin falls into the spurious coin chute 17. It is to be noted that in this embodiment of the invention the gate 58 is actuated after the coin carriage 15 clears the sector 33. Consequently, the gate 58 should be mounted somewhat lower, as shown in Fig. 6, than in the modification shown in Figs. 1 to 5 inclusive, in order to provide the proper amount of time for the actuation of the gate 58 by the magnet 49, before the coin reaches the upper end of the gate. It is further to be noted that this embodiment of the invention does not permit of the use of a projection 60 on the coin carriage or the projection 58 of the gate as in the previously described embodiment.

In the embodiment of the invention diagrammatically illustrated in Fig. 7, the 110-volt alternating current power lines 40 and 41 are connected to the heating coil 39. They are also connected to a rectifier 82 which may suitably be of the copper oxide type. Between the power line 41 and its connection to the rectifier 82 is located a high resistor 83 which may suitably have a resistance of 6000 ohms. The positive lead 84 of the rectifier is connected to the contact 46 of the relay and also to one side of a condenser 85 which may suitably have a capacity of 75 microfarads. The other side of the condenser 85 is connected by a conductor 86 to the conductor 38 which connects one side of the coil of the relay 44 to the heated stud 35. The two conductors 86 and 38 are connected by a conductor 87 to one end of the coil of the electromagnet 49. The negative lead of the rectifier 82 is connected by a conductor 88 to the other side of the winding of the electromagnet 49. The rectifier 82 is preferably arranged so as to provide a voltage of about 4½ volts. A resistor 89, which may suitably have a resistance of 3000 ohms, is shunted across the condenser 85.

The sensitivity of the device is controlled, in a manner which will appear from the preceding discussion of the instrument 44, so that the thermocouple current which passes through a genuine coin, heated stud 35, conductor 38, the moving coil of the relay, conductor 43 and sector 33, is sufficient to bring the contact 45 into engagement with the contact 46. As a result of this contact, a circuit is completed through conductor 84, contact 46, contact 45, conductor 87, conductor 49, conductor 88 and rectifier 82. This circuit being energized by the rectifier energizes the magnet 49 and the gate 58 is swung from the position shown in Fig. 7 into the position in which it diverts the coin into the genuine coin chute 18. As will readily be understood from the preceding description, if the coin is not genuine the points 45 and 46 do not come into engagement and the coin or slug is diverted into the spurious coin chute 17. When the coin carriage reaches the coin releasing position, the thermocouple circuit is broken and the coin falls freely downwardly. Immediately the coin moves out of contact with the heated stud 35 and the sector 33, the points 45 and 46 separate. When they were in contact the condenser 85 was in the discharged condition since it was shunted by a low resistance circuit. This circuit is broken by the separation of the contacts 45 and 46 and the result is that the condenser 85 is charged, since it is connected to the opposite leads of the rectifier 82 by conductor 84 and by conductors 86, 87, winding of the electromagnet 49 and conductor 88.

The charging of the condenser 85 through this circuit causes a current to flow through the winding of the electromagnet 49 for an appreciable time and the direction of this current is the same as the current which passed through the winding when the points 45 and 46 were in engagement. This charging current is sufficient to retain the armature 53 of the electromagnet 49 in genuine coin position so that the falling coin is able to pass into the genuine coin chute 18 before the electromagnet 49 becomes deenergized to the extent that the gate 58 is returned to its normal coin rejecting position shown in Fig. 7. It will be understood that this return is made by spring 54, as shown in Fig. 2.

Although the invention has been disclosed in connection with the specific details of preferred embodiments thereof, it must be understood that such details are not intended to be limitative of the invention except is so far as set forth in the accompanying claims.

Having thus described our invention, what we claim as new and desire to secure by Letters Patent of the United States is:

1. Apparatus for separating genuine and spurious coins comprising a cabinet, a carriage in the interior of the cabinet for receiving an inserted coin, a handle on the exterior of the cabinet for moving said carriage into coin discharge position, a contact on said carriage adapted to be engaged by said coin, means for heating said contact, means for receiving a coin discharged from said carriage, means completing a circuit through a coin in the carriage and said contact, a gate controlling the disposition of the discharged coin, two separate means for receiving discharged coins and electromagnetic means controlled by said circuit for actuating said gate.

2. Apparatus for separating genuine and spurious coins comprising a cabinet, a carriage in the interior of the cabinet for receiving an inserted coin, a handle on the exterior of the cabinet for moving said carriage, a contact on said carriage adapted to be engaged by said coin, means for heating said contact, a plurality of coin chutes below said discharge position, a gate adapted to divert a discharged coin into one or other of said chutes, means completing a thermoelectric circuit through said coin and said heated contact, and electro-magnetic means for moving said gate energized by said circuit when carrying a current of predetermined strength.

3. Apparatus for separating genuine and spurious coins comprising a coin receiving carriage, a contact on said carriage adapted to be engaged by a coin inserted thereinto, means for heating said contact, means for moving said carriage to a coin discharging position, means completing a thermionic circuit through said contact and coin, a gate actuated by a thermoelectric current of predetermined strength for controlling the disposition of the coins, two separate means for receiving discharged coins, and means on the carriage for engaging said gate and holding it in its actuated position when the carriage is in coin discharging position.

4. Apparatus for separating genuine and spurious coins comprising a coin receiving carriage, a contact on said carriage adapted to be engaged by a coin inserted thereinto, means for heating said contact, means for moving said carriage to a coin discharging position, a projection on said carriage, means completing a thermoelectric circuit through said contact and coin, a gate for controlling the disposition of the coin, two separate means for receiving discharged coins, means for holding the gate in one position, said gate having a projection out of the path of the first said projection when the gate is in its normal position, electromagnetic means energized by a thermoelectric current of predetermined strength to move the gate to another position, the movement of the gate carrying its projection into the path of the first said projection whereby the gate is held in its last said position when the carriage is in its coin discharge position.

5. In an apparatus for separating genuine and spurious coins, in combination, a coin carriage, a contact on said carriage adapted to be engaged by a coin inserted therein, means for heating said contact, means for moving the carriage to coin discharging position, means operable on the movement of the carriage for forcing the coin against the contact, a stationary conductive element against which the moving coin abuts, means completing a thermoelectric circuit through said heated contact, coin and stationary contact, means responsive to the current in said circuit for controlling the disposition of the coin discharged from the carriage, and two separate means for receiving discharged coins.

6. In an apparatus for separating genuine and spurious coins, in combination, a coin carriage, a contact on said carriage adapted to be engaged by a coin inserted therein, means for heating said contact, means for moving the carriage from a coin receiving to a coin discharging position, cam means for engaging the coin during its initial movement and forcing it against the heated contact, a stationary contact adapted to engage the coin during its travel and to maintain it against the heated contact, means completing a thermoelectric circuit through said heated contact, coin and stationary contact, means responsive to the current in said circuit for controlling the disposition of the coin discharged from the carriage, and two separate means for receiving discharged coins.

7. In an apparatus for separating genuine and spurious coins, in combination, a coin carriage having a slot for receiving a coin, means for moving the carriage, an insulated contact mounted on said carriage and adapted to be engaged by said coin, means for heating said contact, and means for forcing said coin against the heated contact when the carriage is moved.

8. In an apparatus for separating genuine and spurious coins, in combination, a coin carriage having a slot for receiving a coin, means for moving the carriage, an insulated plate mounted on the back of said carriage for movement away therefrom, resilient means drawing the plate towards the carriage, an insulated contact on said plate adapted to be engaged by said coin, and a heating coil mounted on the insulated plate to maintain the contact at a substantially uniform temperature.

9. In an apparatus for separating genuine and spurious coins, in combination, a cabinet having a coin receiving slot, a carriage comprising a rotatable arm having a coin receiving slot normally in alignment with the slot in the cabinet, an exterior handle for rotating said carriage through a certain angle to a coin discharging position, an insulating plate resiliently mounted on the rear of the carriage to close the rear face of the slot therein, a contact on said plate adapted to be engaged by a coin in the carriage, a heating coil on said plate adapted to maintain the contact at a substantially uniform temperature, cam means to press the coin rearwardly against the contact during the initial movement of the carriage, and a sector adapted to maintain the coin against the contact during the travel of the carriage to its coin discharging position, said sector having a flange to maintain the coin in the carriage until the coin discharge position is reached.

10. In an apparatus for separating genuine and spurious coins, in combination, a carriage adapted to receive a coin, means for moving the carriage to a coin discharging position, a contact on said carriage, a heating element on said carriage for maintaining the contact at a high temperature, means completing a thermoelectric circuit including said coin and contact, an amplifier adapted to deliver a large current when said circuit is broken, the strength of which depends upon the magnitude of the thermoelectric current, a gate located below said coin discharging position for controlling the disposition of the discharged coin, electromagnetic means responsive only to an amplified current of certain magnitude for actuating said gate, and two separate means for receiving discharged coins.

11. In an apparatus for separating genuine and spurious coins, in combination, a pair of contacts between which a coin may be passed, means for heating one of said contacts, a relay having a winding in circuit with said contacts adapted to be energized by the thermocouple current produced by a genuine coin to close the relay, a source of current and electromagnetic means in series with said relay whereby said electromagnetic means is energized when the relay is closed, and a condenser in parallel to said relay whereby a current passes through the electromagnetic means after the relay opens, and means actuated by said electromagnetic means for controlling the disposition of the coin.

12. In an apparatus for separating genuine and spurious coins, in combination, a contact and a heated contact between which a coin may be passed, a relay having a winding in circuit with said contacts adapted to be energized by the thermocouple current produced by a genuine coin to close the relay, a source of alternating current, a rectifier connected thereto adapted to supply direct current, a gate adapted to control the disposition of the coin, an electromagnet for operating the gate, a circuit including the winding of the electromagnet, the rectifier and the relay whereby the electromagnet is energized when the relay is closed, and a condenser in parallel to said relay whereby an energizing current is caused to flow through the winding of the electromagnet after the relay opens.

FRED E. A. WALLIN.
KURT T. JOHNSON.
CARL G. JOHNSON.